United States Patent [19]

Norby

[11] E Patent Number: Re. 31,634

[45] Reissued Date of Patent: Jul. 24, 1984

[54] ALTERNATELY-OPERABLE TWO-PUSHBUTTON SWITCH

[75] Inventor: Thomas E. Norby, Raleigh, N.C.

[73] Assignee: Eaton Corporation, Cleveland, Ohio

[21] Appl. No.: 285,704

[22] Filed: Jul. 22, 1981

Related U.S. Patent Documents

Reissue of:

[64] Patent No.: 4,166,935
Issued: Sep. 4, 1979
Appl. No.: 945,012
Filed: Sep. 22, 1978

[51] Int. Cl.[3] ..... H01H 13/22; H01H 21/40; H01H 3/12

[52] U.S. Cl. ..... 200/72 R; 200/69; 200/159 R; 200/5 E; 200/17 R; 200/340

[58] Field of Search ..... 200/72 R, 69, 152 R, 200/340, 17 R, 5 E

[56] References Cited

U.S. PATENT DOCUMENTS

| | | | |
|---|---|---|---|
| 828,739 | 8/1906 | Hart | 200/337 |
| 1,186,586 | 6/1916 | Klein | 200/77 |
| 1,518,888 | 12/1924 | Winklehaus | 200/72 R |
| 2,295,518 | 9/1942 | Meuer | 200/69 X |
| 2,523,786 | 9/1950 | Soreng | 200/69 |
| 2,773,150 | 12/1956 | Wintle | 337/49 |
| 3,225,156 | 12/1965 | Sahrbacker | 200/5 R X |
| 3,294,926 | 12/1966 | Dellert et al. | 200/72 R X |
| 3,299,222 | 1/1967 | Thompson | 200/5 E |
| 3,308,260 | 3/1967 | Krieger et al. | 200/5 E X |
| 3,322,924 | 5/1967 | Sheps | 200/157 |
| 3,322,926 | 5/1967 | Mukai et al. | 200/168 |
| 3,331,933 | 7/1967 | Smith et al. | 200/159 R X |
| 3,391,257 | 7/1968 | Frank | 200/5 E |

FOREIGN PATENT DOCUMENTS

| | | |
|---|---|---|
| 1903489 | 8/1970 | Fed. Rep. of Germany . |
| 1329705 | 9/1973 | United Kingdom . |
| 1517196 | 7/1978 | United Kingdom . |

*Primary Examiner*—Steven M. Pollard
*Attorney, Agent, or Firm*—C. H. Grace; L. G. Vande Zande

[57] ABSTRACT

An electric switch having two pushbuttons for rocking a pivotal actuator alternately in opposite directions for alternately closing double-throw contacts. The pivotal actuator is snap-in assembled to a switch frame which is snap-in assembled to a switch base or housing that supports the contacts. The two pushbuttons are alike and are guided in their vertical reciprocal motion by the switch frame and by one another. To allow use of minimum height pushbuttons while having ample finger-engaging surface, the pushbuttons are provided with like but complementary guiding structures integrally molded thereon to guide one another in their relative vertically reciprocal movements without binding or "window-locking" with respect to one another or the switch frame.

14 Claims, 8 Drawing Figures

ALTERNATELY-OPERABLE TWO-PUSHBUTTON SWITCH

Matter enclosed in heavy brackets [ ] appears in the original patent but forms no part of this reissue specification; matter printed in italics indicates the additions made by reissue.

BACKGROUND OF THE INVENTION

Two-pushbutton or double-pushbutton switches have been known heretofore. However, prior switches of this type have generally been rather complex requiring many parts and rather wide separation of the pushbuttons. Moreover, such prior switches have required special guiding tubes or slides within the switch housing for guiding them in their reciprocal motions in their paths of travel. This has necessitated rather large switch dimensions generally unsuitable for use where a substantial degree of miniaturization is desired. Consequently, it has been found desirable to provide a double-pushbutton switch of smaller overall dimensions while still retaining ample finger-engaging surface area on the pushbuttons.

While these prior switches have been useful for their intended purposes, this invention relates to improvements thereover.

SUMMARY OF THE INVENTION

An object of the invention is to provide an improved pushbutton switch.

A more specific object of the invention is to provide an improved switch having two pushbuttons with only one operable at a time.

Another specific object of the invention is to provide a two-pushbutton switch with improved pushbutton guiding means allowing locating of the pushbuttons contiguous to one another.

Another specific object of the invention is to provide a switch with two improved, like pushbuttons having complementary guiding structures for guiding them in their vertical reciprocal motions in addition to being guided by the switch frame to prevent sticking or "window locking" on one another or the switch frame.

Another specific object of the invention is to provide a switch with pushbuttons of the aforementioned type having minimum height while retaining ample finger engaging surface area.

Another specific object of the invention is to provide a two-pushbutton switch of the aforementioned type with improved means for mounting a momentary-operation spring with respect to one of the pushbuttons.

Another specific object of the invention is to provide a two-pushbutton switch of the aforementioned type with an improved pivotal contact actuator that not only couples the two pushbuttons for alternate action but also provides clearance for a momentary-operation spring.

Other objects and advantages of the invention will hereinafter appear.

DESCRIPTION OF THE PREFERRED EMBODIMENT

Figure 1:
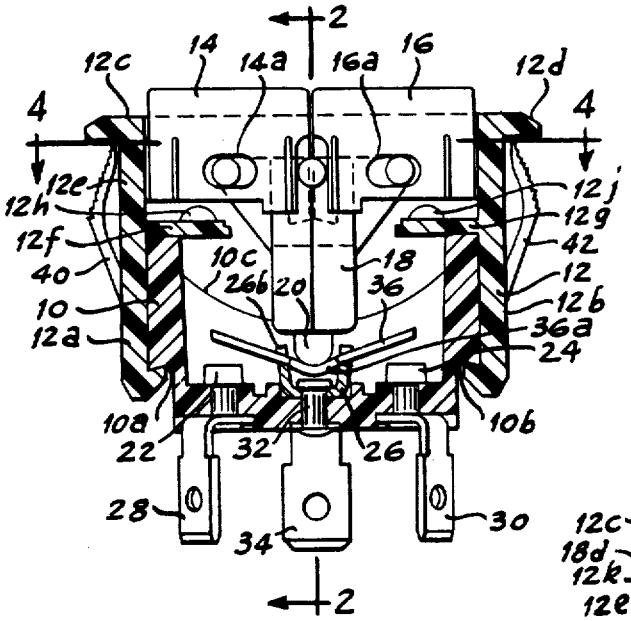
FIG. 1 is an enlarged, longitudinal vertical cross-sectional view of the switch taken substantially along line 1—1 of FIG. 2 to show the two pushbuttons, the contact actuator and one pole of the double-pole contacts in "off" condition.
Figure 2:
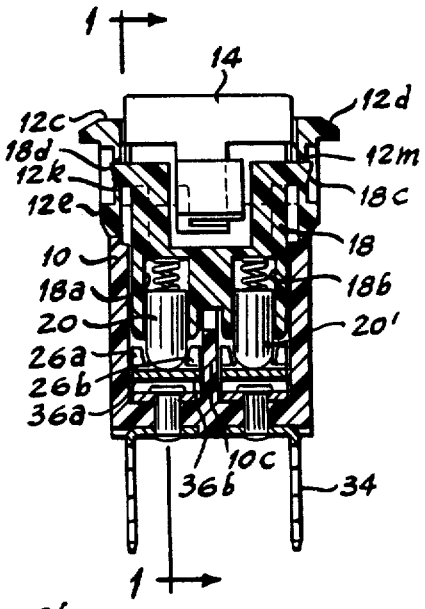
FIG. 2 is a lateral vertical cross-sectional view taken substantially along line 2—2 of FIG. 1 showing the contact actuator snap-in mounting structure and the two poles of the double-pole switch.
Figure 3:
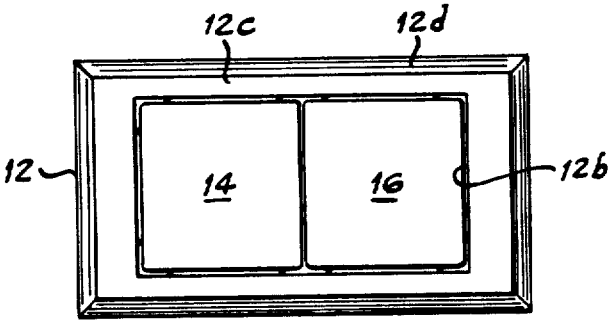
FIG. 3 is a top view of the switch of FIGS. 1 and 2 showing the finger-engaging surface area of the two pushbuttons.

Referring to FIGS. 1–3, there is shown an alternately operable two-pushbutton switch constructed in accordance with the invention. As shown therein, this switch comprises a switch housing including a base 10 and a bezel or frame 12 snap-in mounted to the base. This switch also comprises two like sets of contacts within the base connected to external terminals as hereinafter described providing a double-pole double-throw switch, and contact actuator means. This contact actuator means comprises two like pushbuttons 14 and 16, and a contact actuator 18 pivoted on the frame and coupled to the two pushbuttons for actuation thereby alternately. This contact actuator includes two spring biased plungers 20, 20', one for each pole of the switch. While a double-pole double-throw switch has been illustrated, it will be apparent that other contact arrangements such as single-pole, single-throw, plural-pole single-throw, etc., are possible.

Figure 8:
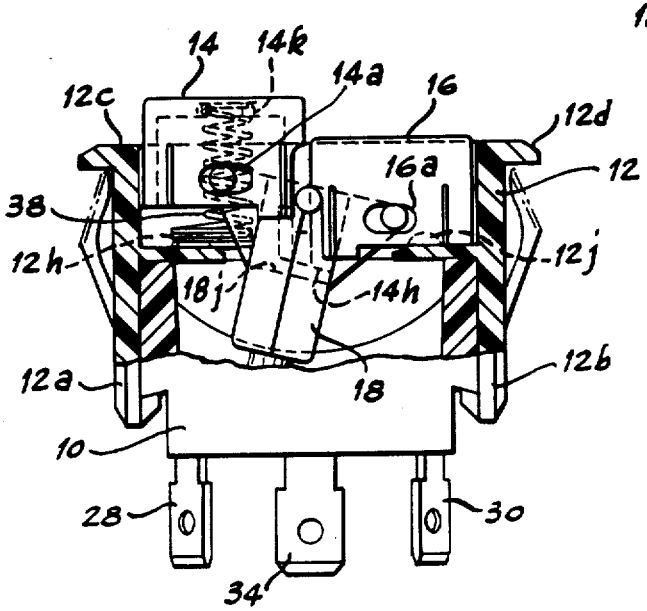
FIG. 8 is a partial longitudinal, vertical cross-sectional view of the switch showing a momentary-operation spring installed within one of the pushbuttons.

Base 10 comprises a generally rectangular open-top cup molded of electrically insulating material and having notches 10a and 10b at the lower portion of its opposite ends for snap-in mounting the two legs 12a and 12b of the frame as shown in FIGS. 1 and 8. Base 10 also has a center dividing wall 10c extending partway up from the bottom longitudinally thereof for dividing the space therein into two equal compartments for the respective poles of the switch. This dividing wall has an arcuate upper edge as shown in FIGS. 1 and 8, dipping at the center, to provide clearance for the swinging movement of contact actuator 18 that straddles it as shown in FIG. 2.

Base 10 is provided with means for supporting two sets of stationary contacts. This means comprises two sets of rivet holes through the bottom of the base, with the holes of each set being spaced apart and in alignment as shown in FIGS. 1 and 2. One set of stationary contacts is shown in FIG. 1 and comprises first and third like contacts 22 and 24 and a second contact 26 therebetween and equally spaced therefrom. Outer stationary contacts 22 and 24 are in the form of enlarged heads on rivets that extend through the corresponding holes in the base and are connected to external spade terminals 28 and 30, respectively, below the base as shown in FIG. 1. Center stationary contact 26 is in the form of a roughly U-shaped cradle that is connected by a rivet 32, extending through the center hole, to an external spade terminal 34 below the base. Cradle 26 not only serves as a common contact for this set of double-throw contacts but also supports movable contactor 36 when it is actuated from its off position shown in FIG. 1 into engagement with either stationary contact 22 or 24. For this purpose, common contact 26 has a pair of spaced upstanding ears 26a and 26b on each of its arms as shown in FIG. 2 between which the movble contactor extends. Also, the movable contactor has a pair of lateral wings 36a and 36b that keep it from sliding left or right on the common contact as seen in FIG. 1, one of these wings being retained between first ears of the two pairs thereof and the other of these wings being retained between the second ears of the two pairs thereof as shown in FIG. 1.

The other set of stationary and movable contacts partly shown in FIG. 2 is similar and therefore will not be described in detail.

Frame 12 comprises a rectangular escutcheon 12c having a beveled edge 12d as shown in FIGS. 1–3. Below this escutcheon, the frame is provided with a rectangular skirt 12e down to the top edge of the base as shown in FIGS. 1 and 2. The opposite end portions of the rectangular opening down through the escutcheon and this skirt are closed by shelves 12f and 12g shown in FIG. 1, leaving a rectangular opening therebetween for the actuator. Each of these shelves has a bump 12h, 12j on its upper surface as shown in FIG. 8 for retaining the lower end of a helical momentary-action spring 38 that may be installed in one or the other pushbutton. The aforementioned legs 12a and 12b, which are partway integral with the skirt, extend down from the ends of the escutcheon and have hooks at their lower ends for snap-in coupling in notches 10a and 10b of the base. These legs also have lateral extensions at their lower ends from which extend upwardly two pairs of arms 40 and 42 for snap-in mounting of the switch in a rectangular hole in a mounting panel. As shown in FIG. 1, the upper ends of these retention arms 40 and 42 are curved and serrated to adapt the switch for mounting on various thicknesses of mounting panel. Aligned holes 12k and 12m are provided centrally of opposite longer sides of the skirt as shown in FIG. 2 for snap-in mounting of actuator 18.

Figure 7:
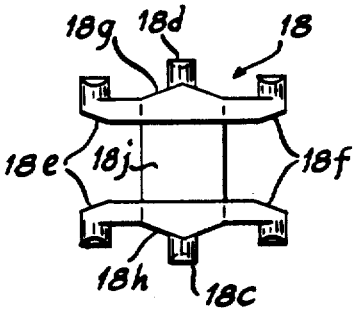
FIG. 7 is a top view of the contact actuator of the switch of FIGS. 1–6 showing its pivotal trunnions and pushbutton-coupling trunnions as well as the clearance spaces between its arms for a momentary spring.

Actuator 18 is shown most clearly in FIGS. 1, 2 and 7. As shown in FIG. 2, it is provided with a pair of holes 18a and 18b extending partway up from its bottom end for retaining spring-biased plungers 20 and 20' that slide along the movable contactors when one pushbutton is pressed. This actuator is also provided with a pair of trunnions 18c and 18d shown in FIG. 7 whereby it is pivotally mounted in the aformentioned holes in the frame as shown in FIG. 2. These trunnions are beveled at their ends to facilitate snap-in mounting of the actuator in the frame. For this purpose, when the actuator and pushbutton assembly is introduced into the frame opening and pressed down from the top, these beveled ends of the trunnions resiliently cam the sides of the frame apart and the trunnions slide down the inside surfaces of the skirt until they snap into their pivoting holes.

This actuator is also provided with means for coupling the same to the two pushbuttons. As shown in FIG. 7, this means comprises a pair of left arms 18e and a pair of right arms 18f. Each of these pairs of arms has right-angled, outwardly directed trunnions that are coupled into oblong holes 14a, 16a in the opposite sides of the corresponding pushbutton as shown in FIGS. 1 and 8. These trunnions at the ends of arms 18e and 18f have their ends beveled for snap-in assembly into the pushbutton holes. These pushbuttons are molded of plastic insulating material and are resilient so that the opposite walls thereof can be spread outwardly and the arms of the plastic molded actuator are resilient so that they can be squeezed inwardly. This allows introduction of the pairs of trunnions between the opposite walls of the pushbutton to be slid into snap-in coupling in the oblong holes of the associated pushbutton. It will be apparent that the pushbuttons are first assembled onto the actuator to form a sub-assembly and the actuator is then snap-in assembled in the frame while the pushbuttons of this sub-assembly enter the opening in the frame.

Figure 4:
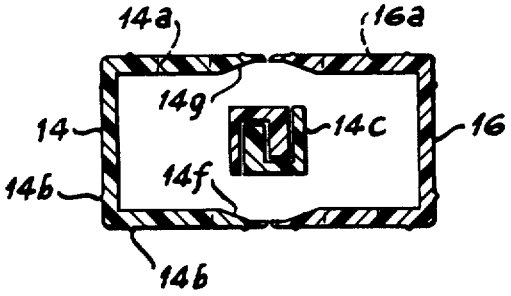
FIG. 4 is a horizontal cross-sectional view taken substantially along line 4—4 of FIG. 1 through the two pushbuttons showing the inter-guiding structures thereof.

The two pushbuttons are alike and one of them is shown most clearly in FIGS. 2, 3, 5 and 6. While the two pushbuttons are alike, the inter-guiding structures thereof become complementary since one pushbutton must be rotated half a turn in order to slidingly couple the two together as shown in FIG. 4, when they are snap-in assembled onto the actuator as hereinbefore described.

Figure 5:
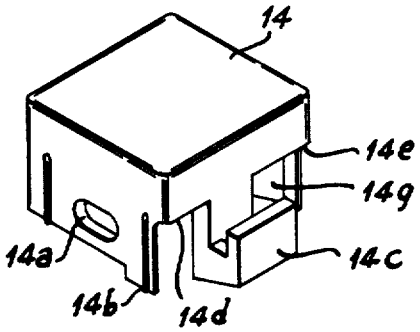
FIG. 5 is an isometric view of one of the two like pushbuttons of the switch of FIGS. 1–4 showing the integral guiding hook thereof.
Figure 6:
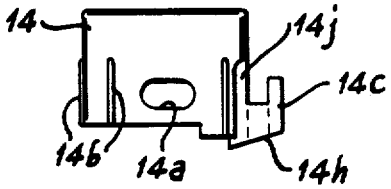
FIG. 6 is a front elevational view of one of the two like pushbuttons showing the clearance angle below its guiding hook.

As shown in FIGS. 3 and 6, pushbutton 14 has a larger horizontal dimension than its vertical height thereby to provide maximum finger-engaging area in a minimum size two-pushbutton switch. This pushbutton is molded of platic electrically insulating material and has a pair of spaced vertical ribs 14b on each of three side walls of preferably semi-circular cross-section to reduce the sliding friction between the pushbutton and the adjacent walls of the frame. The fourth wall to be placed against the other pushbutton has a right-angled hook 14c turning counter-clockwise when viewed from the top as shown in FIGS. 4 and 5. This hook is located substantially centrally of this wall of the pushbutton. This fourth wall of the pushbutton has cutouts 14d and 14e or slots on opposite sides of this hook that eliminate almost the entire parts of the wall on the opposite sides thereof and extend slightly around the adjacent corners thereof. These cutouts provide clearance for pivoting trunnions 18c and 18d and arms 18e of the actuator. Moreover, the side walls of the pushbutton approaching these cutouts are beveled on the inside as shown at 14f and 14g in FIGS. 4 and 5 to provide clearance for the adjacent angular sides 18g and 18h of the actuator shown in FIG. 7.

The pushbutton is also provided with means affording maximum sliding length with respect to the other pushbutton to prevent boiling while at the same time avoiding any interference with the actuator operation. This means comprises bevel 14h at the lower end of hook 14c as shown in FIG. 6. This bevel is in a direction to extend guiding wall 14j of the pushbutton down as far as possible while at the same time clearing intermediate surface 18j, FIG. 7, of the actuator when one pushbutton is depressed as shown in broken lines in FIG. 8.

The switch is shown in its off position in FIG. 1. If pushbutton 16 is depressed, it will drive the actuator clockwise, sliding the plungers to the left along the contactors to bridge stationary contacts 22 and 26 and the corresponding stationary contacts of the other pole of the switch. When button 16 moves down, the actuator correspondingly drives button 14 up above button 16 as shown in FIG. 8.

On the other hand, if button 14 is depressed, it will drive the actuator counter-clockwise, sliding the plungers to the right along the contactors to bridge stationary contacts 24 and 26 as well as the corresponding stationary contacts of the other pole of the switch. During this motion, button 16 moves correspondingly up above button 14.

Depressing the pushbuttons to equal height as shown in FIG. 1 actuates the switch to off position where both contact bridges are open.

For momentary action, that is, automatic return of the switch from a first circuit closed condition, to which it is manually actuated, back to a second circuit closed condition, a coil spring 38 is placed under one pushbutton as shown in FIG. 8. The turns on the lower end of this coil spring are enlarged to surround a detent such as a bump 12h on shelf 12f to retain the lower end of this spring from lateral dislodgement and in place. To retain the upper end of this spring from lateral dislodgement and in place with respect to the pushbutton, a detent such as a circular groove 14k is molded in the ceiling of the pushbutton as shown in broken lines in FIG. 8 to receive the upper end turn of the spring.

Also, in such momentary action switch, the movable contactors are formed in known manner to avoid the center off position and thus provide a two position switch.

Referring to FIG. 8, it will be apparent that the contacts connected to terminals 28 and 34 are normally bridged. When button 14 is depressed, the contacts connected to terminals 30 and 34 become bridged. When button 14 is released, the spring restores the switch to the aforesaid normal condition.

While the apparatus hereinbefore described is effectively adapted to fulfill the objects stated, it is to be understood that the invention is not intended to be confined to the particular preferred embodiment of alternately-operable two-pushbutton switch disclosed, inasmuch as it is susceptible of various modifications without departing from the scope of the appended claims.

I claim:

1. A two-pushbutton switch comprising:

an insulating housing having an opening therein for operating means including guiding walls below said opening;

movable and stationary contacts in said housing;

and contact operating means comprising:

a contact actuator pivotally mounted in said housing and being operable to close and open said contacts;

and operating means comprising:

a pair of pushbuttons filling said opening;

means coupling said pushbuttons to said contact actuator at points spaced on opposite sides of its pivot so that said contact actuator may be pivoted in one or the other direction by depressing the respective pushbutton while causing the other pushbutton to correspondingly rise up;

and inter-guiding means on said pushbuttons for guiding one another in their vertical reciprocal motions while also being guided by said walls of said housing.

2. The two-pushbutton switch claimed in claim 1, wherein:

said pushbuttons are alike and said inter-guiding means thereon are complementary when one pushbutton is turned around with respect to the other pushbutton.

3. The two-pushbutton switch claimed in claim 1, wherein:

said pushbuttons are molded of plastic insulating material and each comprises an upper finger-engaging surface and depending walls;

said actuator is molded of plastic insulating material and comprises two pairs of arms extending in opposite directions;

said coupling means comprises holes in opposite walls of said pushbuttons and lateral trunnions on the ends of said two pairs of arms;

and said pushbutton walls and said two pairs of arms being resilient to allow squeezing of the arms of each pair thereof between the walls of the respective pushbutton followed by snap-in entry of the trunnions in said holes.

4. The two-pushbutton switch claimed in claim 3, wherein:

said contact operating means also comprises:

a momentary-action spring;

and means mounting said momentary-action spring under one of said pushbuttons.

5. The two-pushbutton switch claimed in claim 4, wherein:

the arms of said pairs thereof on said actuator are spaced enough apart to provide space for said momentary-action spring;

and said means mounting said momentary-action spring comprises:

a shelf on said housing extending partway below one of said pushbuttons while leaving space therebeyond for pivotal movement of said contact actuator;

and said momentary-action spring being in compression between said shelf and the inside upper surface of the corresponding pushbutton and extending between and free of the corresponding arms of said contact actuator.

6. The two-pushbutton switch claimed in claim 5, wherein:

said means mounting said momentary-action spring also comprises:

detents on said shelf and on said inside upper surface of said pushbutton for retaining said spring in place.

7. The two-pushbutton switch claimed in claim 3, wherein:

the ends of the trunnions on said two pairs of arms are beveled to facilitate camming them between said walls of said pushbuttons preparatory to snap-in entry thereof into said holes.

8. The two-pushbutton switch claimed in claim [1] *3*, wherein:

said inter-guiding means comprises:

a vertical slot in that wall of each pushbutton that is contiguous to the corresponding wall of the other pushbutton;

and an outwardly projecting hook extending from the wall adjacent said slot on each pushbutton extending through the slot of the other pushbutton and embracing the vertical edge thereof whereby such vertical edge on each pushbutton forms a track along which the hook of the other pushbutton slides during relative vertical motions of the pushbuttons.

9. The two-pushbutton switch claimed in claim 8, wherein:

said contact actuator is provided with a pair of pivoting trunnions extending in opposite directions;

said housing is provided with a pair of aligned holes;

and means including the resiliency of said housing and said actuator for affording snap-in mounting of said pivoting trunnions in said holes thereby to mount said actuator pivotally in said aligned holes.

10. The two-pushbutton switch claimed in claim 9, wherein:

the last-mentioned means comprises beveled ends on said pivoting trunnions to facilitate camming thereof between the walls of said housing preparatory to said snap-in mounting thereof in said aligned holes in said housing.

11. The two-pushbutton switch claimed in claim 9, wherein:

said pivoting trunnions are in spaced relation between and substantially on the same plane as said lateral trunnions on the ends of said two pairs of arms;

and said pushbuttons have slots providing clearance for said pivoting trunnions.

12. The two-pushbutton switch claimed in claim 9, wherein:

said contact actuator is provided with a recess between said pivoting trunnions to provide space for said outwardly projecting hooks of the two pushbuttons.

13. The two-pushbutton switch claimed in claim 12, wherein:

said recess in said contact actuator has a flat bottom;

and said hook including the wall that it extends from being beveled at the bottom to provide maximum inter-engaging wall length between the pushbuttons while at the same time providing clearance with respect to said actuator when each pushbutton is depressed.

14. The two-pushbutton switch claimed in claim 8, wherein:

each said pushbutton has a finger-engaging surface dimension greater than its vertical height;

and each said pushbutton is provided with narrow vertical ridges on its sides contiguous to said housing walls to serve with said inter-guiding means to prevent binding or "window-locking" when depressed.

* * * * *